(12) United States Patent
Bauer et al.

(10) Patent No.: US 9,174,670 B2
(45) Date of Patent: Nov. 3, 2015

(54) HYDRAULIC STEERING AND METHOD FOR DETECTING A VALVE POSITION

(71) Applicant: Danfoss Power Solutions ApS, Nordborg (DK)

(72) Inventors: Thomas Bauer, Sydals (DK); Niels Bjarne Hansen, Aabenraa (DK); Morten Hoeck Petersen, Soenderborg (DK)

(73) Assignee: Danfpss Power Solutions ApS, Nordborg (DK)

( * ) Notice: Subject to any disclaimer, the term of this patent is extended or adjusted under 35 U.S.C. 154(b) by 0 days.

(21) Appl. No.: 14/155,870

(22) Filed: Jan. 15, 2014

(65) Prior Publication Data
US 2014/0216580 A1    Aug. 7, 2014

(30) Foreign Application Priority Data
Feb. 1, 2013    (EP) ..................................... 13000506

(51) Int. Cl.
*B62D 5/08*    (2006.01)
*B62D 5/093*    (2006.01)
*B62D 1/22*    (2006.01)

(52) U.S. Cl.
CPC    *B62D 5/093* (2013.01); *B62D 1/22* (2013.01); *Y10T 137/87225* (2015.04)

(58) Field of Classification Search
CPC ................................. B62D 5/093; B62D 5/32

USPC ......................................... 180/403, 417, 442
See application file for complete search history.

(56) References Cited

U.S. PATENT DOCUMENTS

| 2007/0221437 A1* | 9/2007 | Kryhlmand et al. .......... 180/441 |
| 2009/0114469 A1* | 5/2009 | Thomsen et al. ............. 180/441 |
| 2011/0010055 A1* | 1/2011 | Wahlstrom et al. ............. 701/42 |
| 2013/0245892 A1* | 9/2013 | Chen et al. ...................... 701/42 |

FOREIGN PATENT DOCUMENTS

DE    10 2007 053 024 A1    5/2009

OTHER PUBLICATIONS

European Search Report for Serial No. 130000506.9 dated Oct. 23, 2013.

\* cited by examiner

*Primary Examiner* — Kevin Hurley
*Assistant Examiner* — Gabriela C Craciun
(74) *Attorney, Agent, or Firm* — McCormick, Paulding & Huber LLP

(57) ABSTRACT

The invention concerns a hydraulic steering (1) comprising a supply connection arrangement, a steering motor (2), a high pressure supply (P), and a steering unit (3) arranged between the supply connection arrangement (S) and the steering motor (2), the supply connection arrangement comprising a steering valve (9), and a valve arrangement (27). The task of the hydraulic steering is to improve the safety and faults detection over the state of the art. For this purpose, the steering valve (9) is only deflectable if the valve arrangement (27) is deflected.

10 Claims, 2 Drawing Sheets

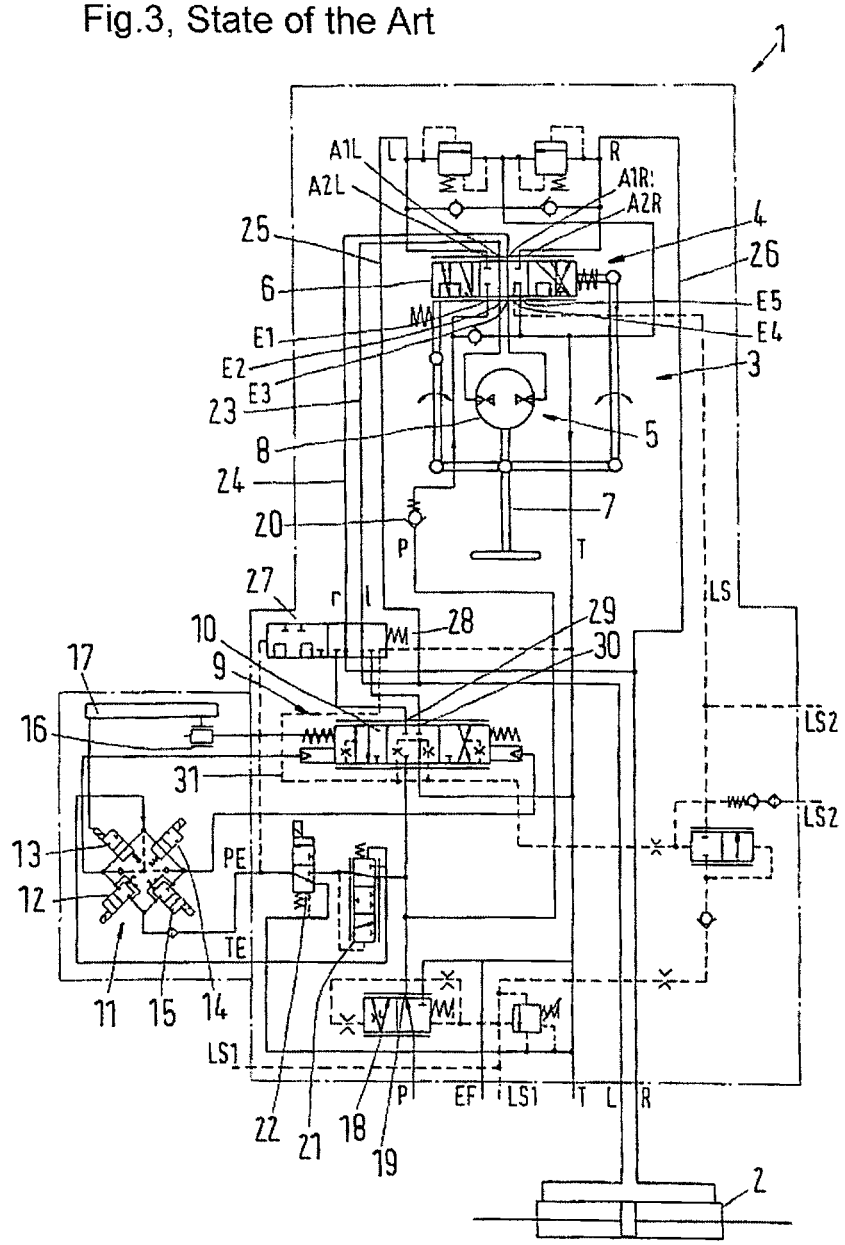
Fig.3, State of the Art

HYDRAULIC STEERING AND METHOD FOR DETECTING A VALVE POSITION

CROSS REFERENCE TO RELATED APPLICATION

Applicant hereby claims foreign priority benefits under U.S.C. §119 from European Patent Application No. 13000506.9 filed on Feb. 1, 2013, the contents of which are incorporated by reference herein.

TECHNICAL FIELD

The invention relates to a hydraulic steering comprising a supply connection arrangement, a steering motor, a high pressure supply, and a steering unit between the supply connection arrangement and the steering motor, the supply connection arrangement comprising a steering valve, a stop valve and a valve arrangement. The invention further relates to a method for detecting the position of at least one first valve by activating a second valve.

BACKGROUND

Such a hydraulic steering is, for example, known from DE 10 2007 053 024 B4. A vehicle equipped with such a steering can either be steered via the steering unit comprising a directional section, or via the steering valve. The driver will then usually activate a steering member, for example a steering hand wheel. When the driver steers the vehicle by means of the steering unit, in many cases a so called reaction behavior is desired, that is, the driver must feel through the steering hand wheel that forces are acting upon the steering motor.

However, this reaction behavior causes problems, if the vehicle is steered by means of the steering valve. Thus, in the state of the art for each steering direction the directional section comprises a first outlet, which is connected to the steering motor by means of a first pipe, and a second outlet, which is connected to the steering motor by means of a second pipe, the first pipe being, in the neutral position of the directional section, connected to a measuring section, and the first pipe being interruptible by means of the valve arrangement.

With this solution a reaction of the steering motor is achieved both if the directional section is activated and if the directional section is in a neutral position. Forces acting upon the steering motor are transferred via the first pipe to the first outlet and via the directional section to the measuring motor.

In some cases it happens that a valve gets stuck, that is, in spite of an activation signal the valve does not change its position as specified by the activation signal. If now, for example, the valve arrangement gets stuck in a closed position and interrupts the first pipe the second pipe will bypass the valve arrangement. This way the hydraulic steering can still be operated via the steering unit. The disadvantage of this solution is that the steering resistance will be higher if the valve arrangement gets stuck. At the same time such a wrong valve position cannot be directly detected during normal operation within a hydraulic steering according to the state of the art.

SUMMARY

Thus, the underlying task of the invention is to provide a hydraulic steering that allows to detect at least for some of the valves if they are in the correct position.

The problem is solved in a hydraulic steering of the above mentioned type in that the steering valve is only deflectable if the valve arrangement is deflected.

This way the steering valve can be used to detect if the valve arrangement is stuck in a faulty position. Then one may test if the steering valve is deflectable and will consequently find out if the valve arrangement is deflected or not. This improves the safety of the system without introducing new components and thus at the same time will not increase the production costs compared to the state of the art.

Preferably the supply connection arrangement further comprises a stop valve and the steering valve is only deflectable if both the stop valve and the valve arrangement are in a deflected position. This way by testing if the steering valve is deflectable one will detect if there is a faulty position of either one or both of the valve arrangement and the close valve.

In a preferred embodiment the hydraulic steering further comprises a hydraulic bridge circuit arranged between the valve arrangement and at least one pilot supply of the steering valve. Such a bridge circuit allows to supply the steering valve with hydraulic pressures that are necessary to displace the steering valve. Thus, if the bridge circuit is arranged between the valve arrangement and the at least one pilot supply of the steering valve the valve arrangement is able to interrupt the pressure supply to the bridge circuit. In the state of the art the bridge circuit is connectable to a high pressure supply by opening a close valve irrespectable of the valve position of the valve arrangement.

In a further preferred embodiment the stop valve in the deflected position connects a pilot supply of the valve arrangement to the high pressure supply. This way the valve arrangement can only be displaced if the stop valve has been displaced.

In another preferred embodiment the valve arrangement is hydraulically activated by opening the close valve. This way opening the close valve will automatically also activate the valve arrangement.

It is preferred if the valve arrangement in the deflected position connects the hydraulic bridge circuit to the high pressure supply. This way the hydraulic bridge circuit can only supply the steering valve with hydraulic pressure differences if the valve arrangement has been displaced. This improves the fault protection of the hydraulic steering.

Preferably the steering valve is connectable to the steering motor via the valve arrangement. Preferably in the valve position in which a valve arrangement connects the steering valve to the steering motor the valve arrangement will also connect the hydraulic bridge circuit to the high pressure supply such that the steering valve may be displaced. In its other valve position the valve arrangement may then interrupt the connection between the steering motor and the steering valve. In this valve position the steering valve may then also open additional pipe connections between the steering motor and the steering unit.

Preferably the steering valve is deflectable within a dead band without changing the valve position. This way one may check if the steering valve is deflectable without moving the steering valve into a different valve position. This way one may or easily detect an error in the valve position of the close valve or the valve position of the valve arrangement by trying to displace the steering valve within its dead band.

In a further preferred embodiment the steering valve is only deflectable if one of the at least one pilot supplies is connected to the high pressure supply. In this embodiment it is rather simple to ensure that the steering valve is only deflectable if the valve arrangement is deflected.

BRIEF DESCRIPTION OF THE DRAWINGS

In the following, the invention is described on the basis of preferred embodiments with reference to the drawings, showing.

DETAILED DESCRIPTION

Figure 1:
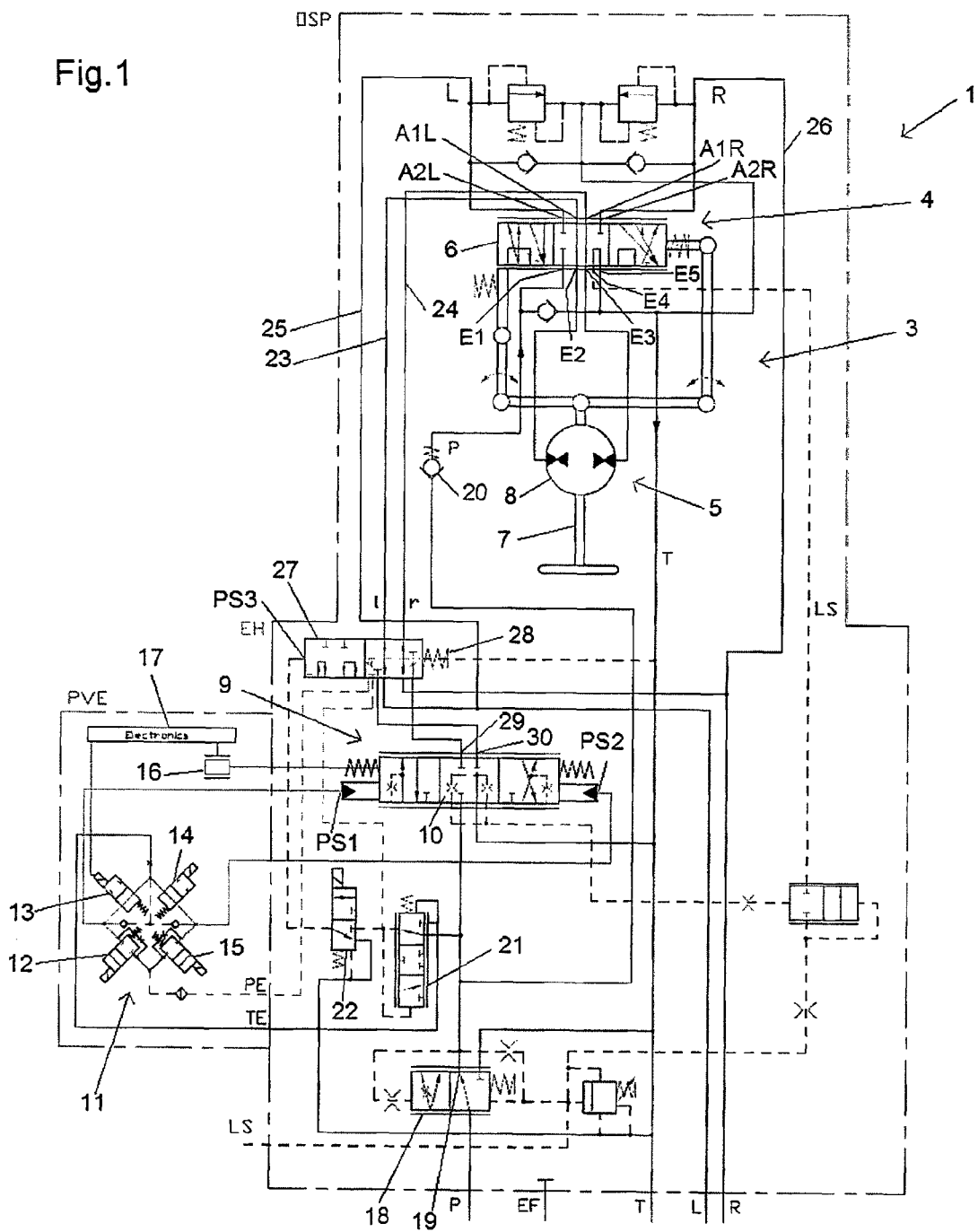
FIG. 1 a hydraulic steering according to the invention,
FIG. 2 a valve arrangement according to the invention,
FIG. 3 a hydraulic steering according to the state of the art.
Figure 2:
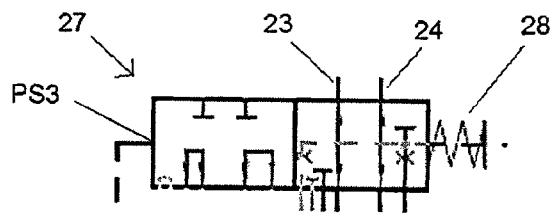

In FIGS. 1 and 2 a hydraulic steering 1 according to the invention is disclosed. In FIG. 2 the valve arrangement as disclosed in FIG. 1 is shown in more detail. In FIG. 3 a hydraulic steering according to the state of the art as disclosed in DE 10 2007 053 024 B4 is shown.

In FIG. 1 a hydraulic steering 1 is supplied with pressurized hydraulic fluid via a supply connection arrangement. The supply connection arrangement has a high pressure connection P and a low pressure connection T.

The hydraulic steering 1 serves the purpose of steering a steering motor 2, which has two connections L, R.

The hydraulic steering 1 has a steering unit 3 with a directional section 4 and a measuring section 5, which can, in a manner known per se, be formed by a measuring motor 8. Here, the steering unit 3 is a "close-center" unit. However, also an "open-center" unit can be used.

The directional section 4 has a valve, here simply shown as a directional valve slide 6, which can be displaced into three different positions, namely the neutral position shown, and two directional positions displaced from the neutral positions. In reality, the directional section 4 will often have two mutually rotatable valve sleeves, which are rotatably supported in a housing. One of these sleeves is connected to a steering hand wheel 7. The other valve sleeve is connected to the measuring motor 8 of the measuring section 5. The principle embodiment of such a steering unit 3 is known in the state of the art.

Further, the steering 1 has a steering valve 9 with a steering valve slide 10. The steering valve slide 10 is only shown schematically. It can be displaced from the neutral position shown into two directional positions. The displacement takes place by means of hydraulic pressures, which are supplied via a hydraulic bridge circuit 11. The hydraulic bridge circuit 11 comprises four, for example electrically activated, valves 12 to 15. Depending on which of the valves 12 to 15 are opened, the steering valve slide 10 is displaced to the left or to the right (in relation to the view of FIG. 1). The resulting position of the slide 10 is detected by a sensor 16 and reported to a control electronic 17.

The control electronic 17 and the sensor 16 can be used to check the valve position of the steering valve 9. This may be used to check for faulty valve positions of other valves in the hydraulic steering that do not comprise a sensor. This will be explained in more detail later on.

The high-pressure connection P is connected to a priority valve 18, whose priority outlet 19 is connected to the steering unit via a non-return valve 20. The priority outlet is also connected to an inlet of the steering valve 9 and an inlet of a pressure control valve 21. The pressure control valve 21 may supply an adjustable pressure at its outlet. Between the pressure control valve 21 and the bridge circuit is arranged a stop valve 22 and a valve arrangement 27. When the stop valve 22 is in an open position a pressure supplied by the pressure control valve 21 will be delivered via the stop valve 22 to a pilot supply PS3 of the valve arrangement 27. This will activate the valve arrangement 27 and move it out of the neutral position opening a connection between the pressure control valve 21 and the hydraulic bridge circuit 11. Thus, if the stop valve 22 is closed pressurized hydraulic fluid will be prevented from reaching the hydraulic bridge circuit 11. In this case due to the lack of supply of hydraulic pressures to the hydraulic bridge circuit 11 the steering valve 9 cannot be activated. The steering valve 9 can be a proportional valve.

The directional section 4 has five inlets E1, E2, E3, E4, E5. Here, the term "inlet" has been chosen for reasons of simplicity. Hydraulic fluid can also flow off from the directional section via an inlet. The inlet E1 is connected to the priority outlet 19 of the priority valve. The inlets E2, E3 are connected to the measuring section 5. The inlet E4 is connected to a load sensing pipe LS, and the inlet E5 is connected to the low-pressure connection T.

The directional section 4 has four outlets A1L, A1R, A2L, A2R. Thus, for each steering direction a first outlet A1L, A1R and a second outlet A2L, A2R is provided. The first outlets A1L, A1R are connected via a first pipe 23, 24, respectively, to the steering motor 2. The second outlets A2L, A2R are also connected via a second pipe 25, 26, respectively, to the steering motor 2. The first pipes 23, 24 can be opened (shown position) or interrupted via the valve arrangement 27, when the valve arrangement 27 is switched over. Also here, the term "outlet" has been chosen for reasons of simplicity. Hydraulic fluid can also flow into the directional section via an outlet.

In the shown neutral position of the directional valve slide 6, the first two pipes 23, 24 are connected to the measuring motor 8 through the directional valve slide 6. The two second pipes 25, 26 are interrupted by the directional valve slide 6, that is, they are neither connected to the measuring section 5 nor to the supply connection arrangement. In the shown position of the valve arrangement 27, this causes that pressure changes occurring on the steering motor 2 because of external forces will result in a reaction on the steering motor 8 and thus on the steering hand wheel 7. In many cases, this is desired. When the steering unit 3 is activated, pressurized hydraulic fluid gets from the priority outlet 19 through the steering valve slide 6 to the measuring motor 8 and from there (when steering to the left) via the first outlet A1L into the first pipe 23 and via the second outlet A2L into the second pipe 25. Here, the two pipes are arranged in parallel to each other. With a steering movement in the opposite direction, the same applies for the outlets A1R, A2R and the pipes 24, 26.

Usually, the steering unit 3 is only activated to move the steered wheels of a vehicle. As soon as they have reached their position, the steering unit 3 is deactivated again. This also applies, if at that time the wheels are set in an angle to the vehicle steering axis. The directional section 4 then returns to the neutral position.

If, with a steering unit 3 in the neutral position, the vehicle is steered via the steering valve 9, the stop valve 22 is activated. Then a pilot supply PS3 of the valve arrangement 27 will be supplied with a high pressure from the high pressure supply P and will thus be displaced out of the neutral position. In this displaced position a hydraulic path from the pressure control valve 21 to the hydraulic bridge circuit 11 will open in the valve arrangement 27. Thus a high pressure supplied by the pressure control valve 21 will reach the hydraulic bridge circuit 11, and thus the steering valve 9 can be displaced in one of the two directions. In the displaced position the valve arrangement 27 will also interrupt the two first pipes 23, 24. Instead, two outlets 29, 30 of the steering valve 9 are connected to the two pipes 25, 26, so that the steering motor 2 can now also be steered via the steering valve 9.

As soon as the stop valve 22 is closed the valve arrangement 27 is no longer supplied with a pilot pressure and will thus move back into the neutral position. In the neutral position of the valve arrangement 27 the hydraulic bridge circuit 11 will no longer be supplied with hydraulic pressure differences, thus the steering valve 9 will no longer be deflectable. At the same time, the two first pipes 23, 24 are open again.

If the vehicle is steered via the steering valve 9, the two first pipes 23, 24 are interrupted by the valve arrangement 27. The two pipes 25, 26 are interrupted by the directional section 4. Accordingly, a reaction to the steering hand wheel 7 does not take place, if external forces act upon the steering motor.

If the vehicle is steered via a steering valve 9, the hydraulic pressure supplied to the steering motor 2 by the steering valve 9 is always lower than a pressure that would origin from the steering unit 3. If, in a situation, where the vehicle is steered via the steering valve 9, the driver activates the steering hand wheel 7, the steering unit 3 first supplies a somewhat higher pressure than the steering valve 9. This pressure is passed on to the steering motor 2 through one of the two pipes 25, 26, even though the two first pipes 23, 24 are interrupted. Also when the steering valve 9 is still active or blocks the valve arrangement 27, a steering of the vehicle by means of the steering unit 3 is possible.

The two first pipes 23, 24 are always controlled in common with the valve arrangement 27, that is, they are practically released or interrupted at the same time.

The valve arrangement 27 does not only disconnect the reaction function, but generally also makes the steering 1 safer.

Now there may be situations when the steering mode of the hydraulic steering 1 needs to be changed, but the close valve 22 and/or the valve arrangement 27 get stuck and does not change position. This will either mean that the vehicle cannot be steered by the steering valve 9 (if either of the valves 22, 27 are stuck in the neutral position) or that the steering resistance of the manual steering via the steering unit 3 is larger (if either one or both of the valves 22, 27 are stuck in a displaced position).

With a hydraulic steering according to the invention one may now test for such a faulty position of the stop valve 22 and/or the valve arrangement 27 by means of the steering valve 9.

Such a test can be applied in the following way:
- Activating the control electronic 17 to supply the steering valve 9 with a hydraulic pressure via the hydraulic bridge circuit 11 to displace the steering valve 9 within a dead band;
- Measuring the actual displacement of the steering valve 9 using the sensor 16;
- Comparing if the valve position of the steering valve agrees with the expected position of the steering valve;
- Giving an error signal if the actual valve position does not coincide with the expected valve position of the steering valve.

By this method if either one of the steering valve 9, the close valve 12 or the valve arrangement 27 is stuck in a faulty position it can be detected and reported for example to the driver via an alarm signal.

Of course this method may be used on a more basic level to detect the position of at least one first valve (in the given embodiment the close valve 22 or the valve arrangement 27) by activating a second valve (in the given embodiment the steering valve 9), wherein the second valve can only be displaced if all of the at least one first valves are in a displaced position. The method comprises:
- Activating the second valve to displace the valve position of the second valve,
- Checking if the second valve is in the expected position.

Thus one may detect an error in one of a plurality of valves by only checking if one valve can be displaced.

In FIG. 2 a hydraulic steering according to the state of the art is disclosed, wherein the same components are denoted with the same reference signs.

Here the close valve 22 in the open position is directly connected to both the hydraulic bridge circuit 11 and the pilot supply of the valve arrangement 27. Thus opening the close valve 22 will displace the valve arrangement 27 to connect the steering motor 2 to the steering valve 9 and will supply the bridge circuit 11 with hydraulic pressures.

Now if the close valve 22 is open but the valve arrangement 27 is stuck in the neutral position the steering valve can be displaced but there is no connection of the steering valve 9 to the steering motor 2 and thus no steering reaction. Consequently, checking if the steering valve 9 is displaceable would not allow to detect if the valve arrangement 27 is in a faulty position within the state of the art. Thus the improved safety and fault detection of the invention becomes clear.

While the present invention has been illustrated and described with respect to a particular embodiment thereof, it should be appreciated by those of ordinary skill in the art that various modifications to this invention may be made without departing from the spirit and scope of the present.

What is claimed is:

1. A hydraulic steering comprising a supply connection arrangement, a steering motor, and a steering unit arranged between the supply connection arrangement and the steering motor, the supply connection arrangement comprising a steering valve, and a valve arrangement,
   wherein the steering valve is only deflectable if the valve arrangement is deflected,
   wherein the supply connection arrangement (S) further comprises a stop valve, and wherein one of at least one pilot supply of the steering valve is connected to a high pressure supply (P) only if both the stop valve and the valve arrangement are in a deflected position.

2. The hydraulic steering according to claim 1, wherein the hydraulic steering further comprises a hydraulic bridge circuit arranged between the valve arrangement and at least one pilot supply (PS1, PS2) of the steering valve.

3. The hydraulic steering according to claim 1, wherein the stop valve in the deflected position connects a pilot supply (PS3) of the valve arrangement to the high pressure supply (P).

4. The hydraulic steering according to claim 1, wherein the valve arrangement is hydraulically activated by opening the stop valve.

5. The hydraulic steering according to claim 2, wherein the valve arrangement in the deflected position connects the hydraulic bridge circuit to the high pressure supply (P).

6. The hydraulic steering according to claim 1, wherein the steering valve is connectable to the steering motor via the valve arrangement.

7. The hydraulic steering according to claim 1, wherein the steering valve is deflectable within a dead band without changing the valve position.

8. The hydraulic steering according to claim 1, wherein the steering valve is only deflectable if one of at least one pilot supply (PS1, PS2) of the steering valve is connected to the high pressure supply (P).

9. The hydraulic steering according to claim 2, wherein the stop valve in the deflected position connects a pilot supply (PS3) of the valve arrangement to the high pressure supply (P).

10. The hydraulic steering according to claim 2, wherein the valve arrangement is hydraulically activated by opening the close valve.

\* \* \* \* \*